Dec. 17, 1940.　　　　　　　E. C. NEAL　　　　　　　2,225,079
BRAKE
Filed May 6, 1937　　　　3 Sheets-Sheet 1
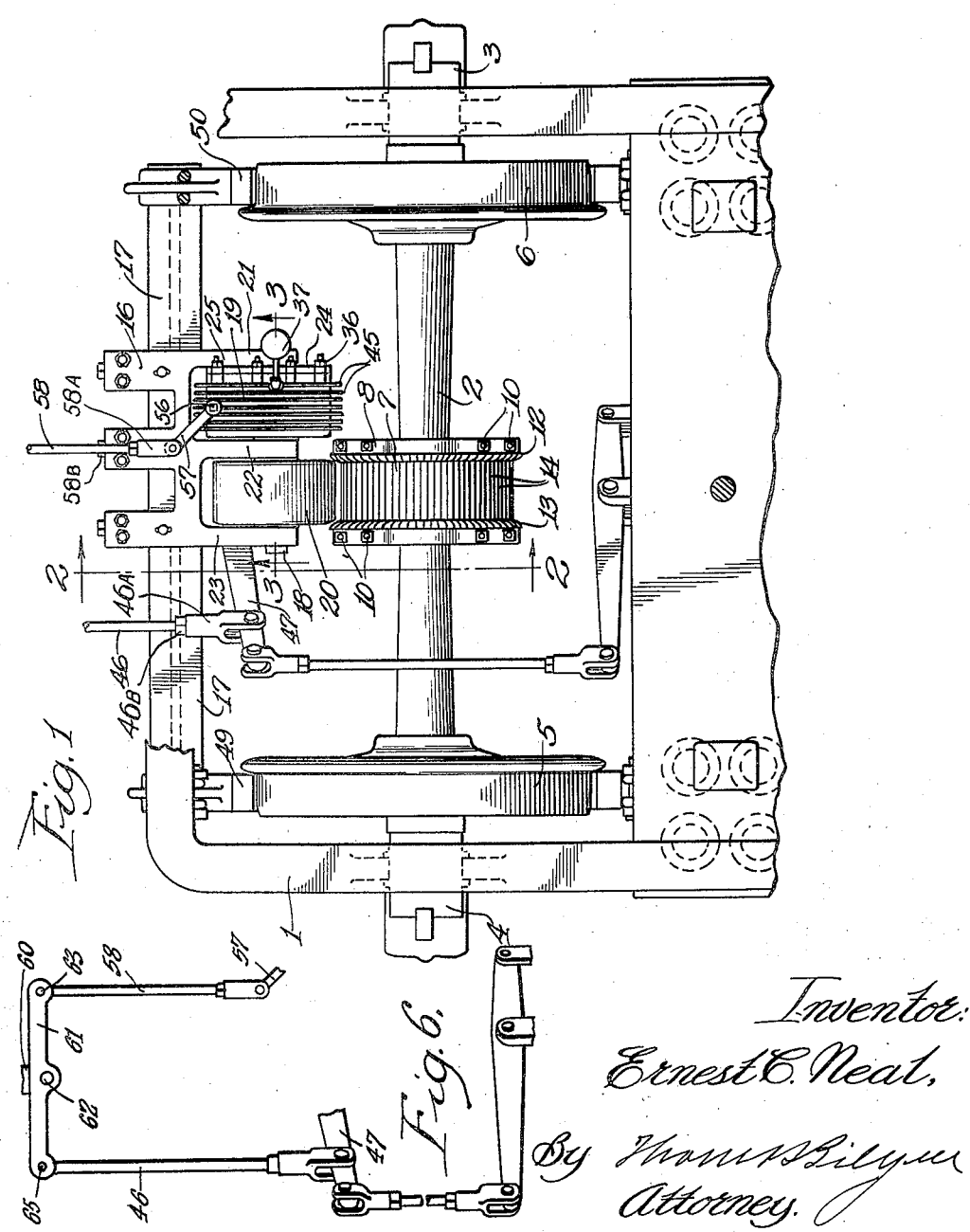

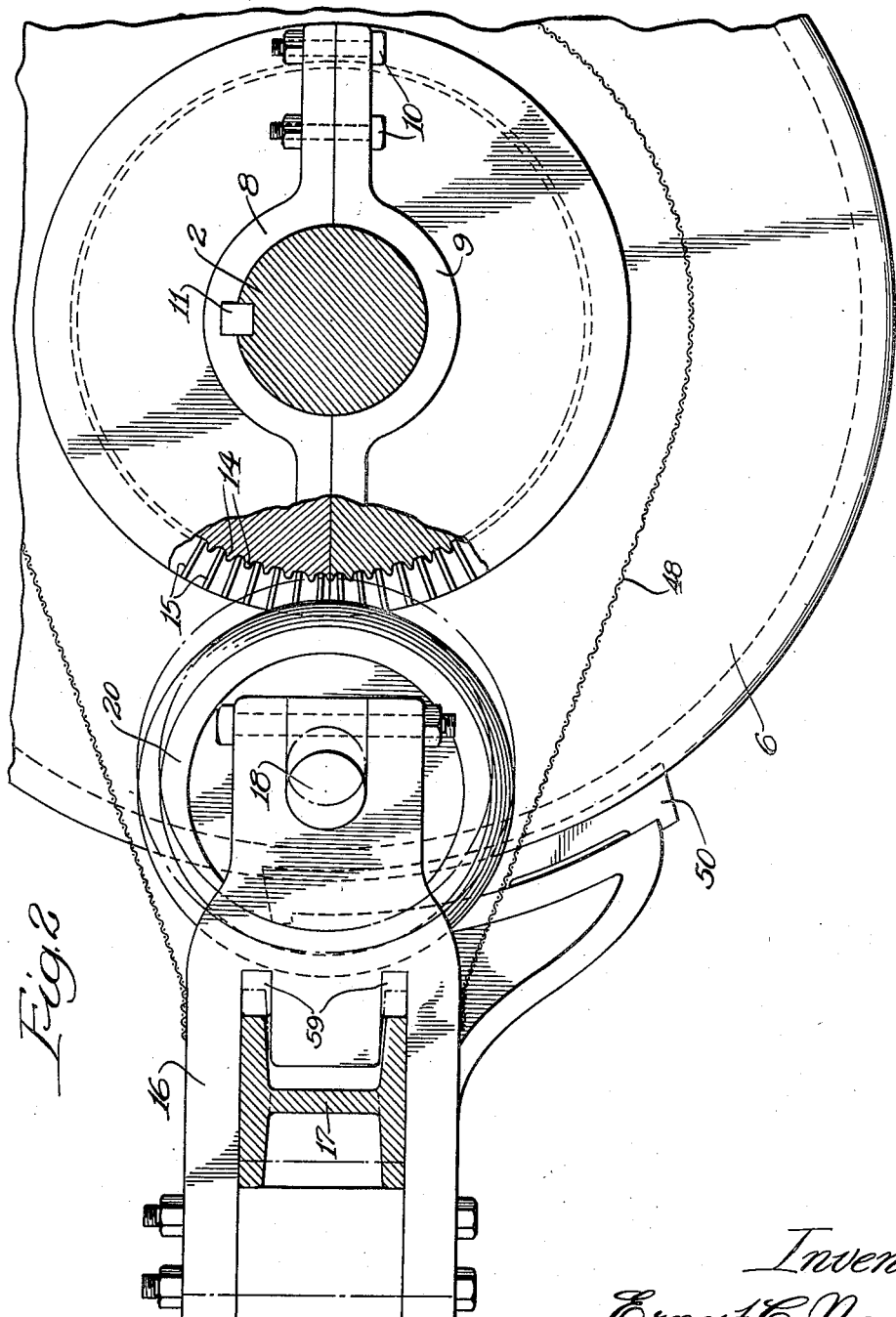

Dec. 17, 1940.    E. C. NEAL    2,225,079
BRAKE
Filed May 6, 1937    3 Sheets-Sheet 3
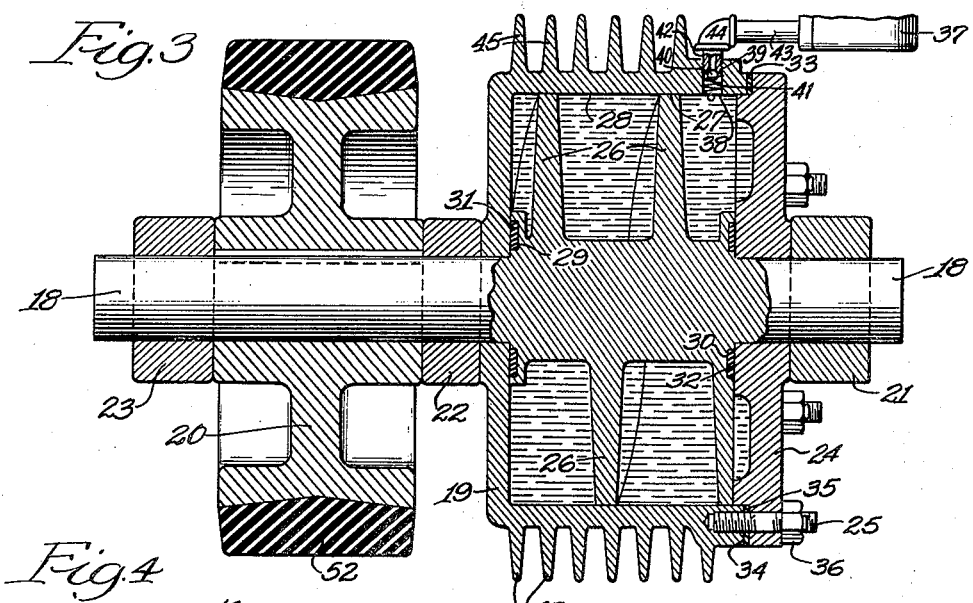
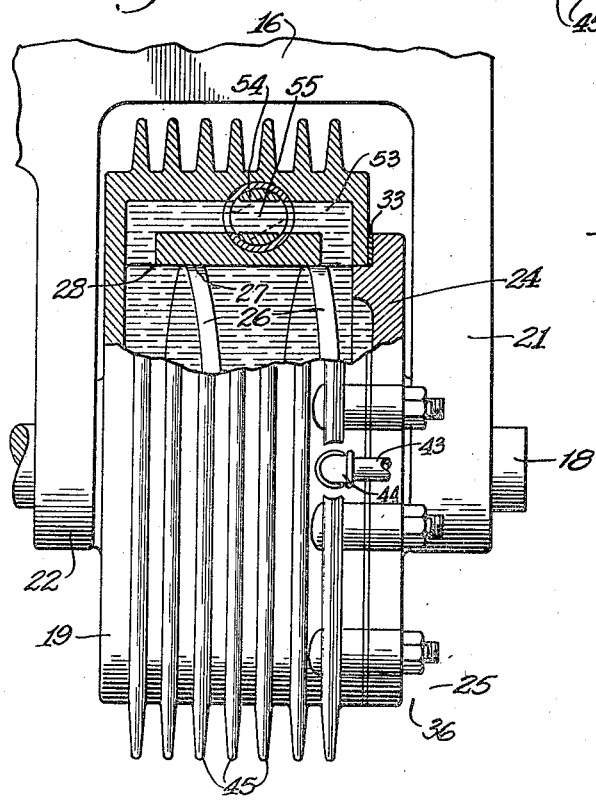
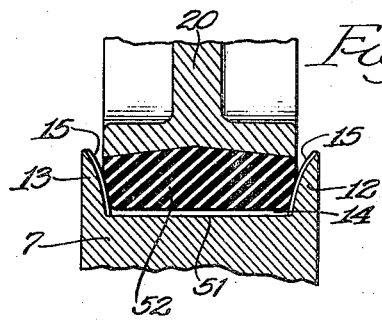
Inventor:
Ernest C. Neal,
By [signature]
Attorney.

Patented Dec. 17, 1940

2,225,079

UNITED STATES PATENT OFFICE 2,225,079

BRAKE

Ernest C. Neal, Coquille, Oreg.

Application May 6, 1937, Serial No. 141,038

5 Claims. (Cl. 188—153)

Heretofore in railway brakes, the braking effort has been applied through the use of metal to metal usually accomplished through the use of the conventional brake shoe which was made to contact the periphery of the wheel to be retarded. In the high speed trains that are being operated at the present time, the engagement of the metals in brake application has generated great heat which in many instances has melted the brake shoe, and has also had a deleterious effect upon the wheel.

My new and improved device is intended to be used as a retarder that may be independently used upon the car wheels of both freight and passenger cars, or it may be used in conjunction with the present brake appliances and be used as an auxiliary device and be so arranged as to be most effective in the retarding of the rotation of the wheels during the intial stopping of the rotation of the wheels.

The primary purpose and object of my invention is to provide a device that may be used in the retarding of the rotation of car wheels and particularly wheels of railway equipment, as under freight and passenger car wheels. The braking effort to be applied is obtained from the present air brake applicators, and from appliances that are installed on train equipment.

A further object of my device is to provide a brake retarder that may be installed on any car in a train, either freight or passenger without in any way affecting the train control and operation whether other cars in the train are so equipped or not.

A still further object of my invention is to so construct my device that it may be used with the car being run in either direction without in any way affecting the operating efficiency of the brake.

A still further object of my device is to so construct the device that no abrasive effect will be applied to the car wheel excepting that of the wheel contacting the rail. My brake uses the hydraulic principle, and through its use and application, I place a wheel upon the car axle, and I provide a brake wheel that is rubber tired that is moved into and out of engagement with the wheel disposed upon the car axle. The rubber tired wheel is mounted upon a shaft upon which a hydraulic pump is mounted. The pump circulates a fluid in a closed cycle and the freedom of flow of the fluid is regulated by a valve that is actuated into open and closed position by present train control brake appliances now in general use. Foreign matter is kept out of the brake mechanism through the use of a screen that encloses the assembly. A filler cap is provided to facilitate the maintaining of a surplus amount of fluid available for the pumping unit in order that the pump cylinder may be automatically maintained full at all times, and with a surplus of fluid being available which will automatically drain into the cylinder if needed.

While I have here shown my device as being used upon railway rail trucks and being used in conjunction with wheels and brake shoes I do not wish to be limited in the application of my device to railway use.

The simplicity of the construction and the ease of application in applying the same lends the application to all forms of transportation where wheels are used and where the stopping of the same is accomplished through brakes of the conventional type. The valve may be actuated by any of the conventional means, as pull cords, pull or push rods and by pneumatic, hydraulic or by electric actuators.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a fragmentary plan view of a railway car truck and a plan view of my assembled device shown installed upon the frame and the car axle of the truck.

Fig. 2 is an end view of the car axle and a fragmentary side view of the car truck illustrating in fragmentary side view, my device installed thereupon. This view is taken on line 2—2 of Fig. 1, looking in the direction indicated. In this view the housing of the wheel disposed upon the car axle is partially broken away to show the construction of the same.

Fig. 3 is a section front view of the pump cylinder and the rubber covered wheel, illustrating the wheel and the pump as being mounted upon a common shaft. This view is taken on line 3—3 of Fig. 2, looking in the direction indicated.

Fig. 4 is a partial plan view of the pump housing and frame for mounting the pump. In this view the pump housing is partially broken away to better illustrate the construction of the housing and the control valve and port associated therewith.

Fig. 5 is a fragmentary sectional view of the rubber tired wheel and of the wheel mounted upon the car axle. This view is made to illustrate the cooperative effect obtained when the rubber covered tire meets the corrugated surface of the wheel that is mounted upon the car axle.

Fig. 6 is a diagrammatic layout of the application of the device to the existing manipulative mechanism of the air brakes disposed adjacent to and mounted upon the standard railway truck.

Like reference characters refer to like parts throughout the several views.

Where my device is to be used on the railway equipment as freight, passenger, work cars of tenders, my device is applied to the wheel supporting truck 1. The axle 2 of the truck is journaled within suitable bearings 3 and 4 that are disposed adjacent the opposite ends of the axle. Flanged wheels 5 and 6 are mounted upon the axle 2. The wheel 7 is preferably split into half sections 8 and 9. The half sections are secured together in any suitable manner as through the use of bolts 10. One or both of the half sections are keyed to the axle 2 by any suitable key 11.

The wheel 7 is shrouded at its sides, as illustrated at 12 and 13 to form peripheral ledges about the wheel. I preferably form uniformly spaced corrugations 14 upon the broad surface of the wheel. The inner surface of each of the shrouds 12 and 13 have corrugations 15 that meet and register with the corrugations 14 disposed upon the broad surface of the wheel 7. I mount a frame 16 slidably upon one of the transverse brake bars 17 of the truck frame. Within this frame I journal a stub shaft 18. The stub shaft 18 runs transversely of the pump housing 19 and transversely of the brake wheel 20. The shaft 18 is journaled within the frame 16 at three points as illustrated at 21, 22 and 23.

The pump housing 19 has a removable face 24 that is secured thereto and removable therefrom through the action of suitable fastening studs or bolts 25. The shaft 18 has a spiral screw 26 disposed thereupon. The screw 26 may be made independent of the shaft 18 and may be secured thereto by being pressed thereon, keyed thereto or it may be cast integral with the shaft. The outer face 27 of the spiral screw is machined to precisely fit the inner face 28 of the pump housing.

Grooves 29 and 30 are machined, or otherwise formed, within the face of the hubs of the screw and compressible gaskets 31 and 32 are placed within said grooves. A gasket 33 is also disposed between the outer face of the pump housing 34 and the inner face 35 of the plate 24. When the nuts 36 are tightened upon the studs or screws 25 the pump housing is hermetically sealed.

The pump housing 19 may be maintained full of operating fluid by communicating a supply tank 37 with the interior of the pump housing. The inlet port 38 is placed within the pump housing. The port is placed at a higher point than that the maximum heighth of the interior of the pump housing.

A valve seat 39 being placed within the port 38. A ball check valve 40 is normally seated thereupon a compressible element, as coiled spring 41. Pipe nipples 42 and 43 and an elbow 44 completing the connection between the port and the tank 37.

To aid in the cooling of the pump housing and the operating fluid disposed therewithin I provide a plurality of spaced cooling fins 45 about the outer surface of the pump housing.

A bifurcated pull rod 46 is secured to the air brake operating lever 47 that is normally used in applying the brake shoes 49 and 50 that are used on the conventional air brake operation.

The bifurcated rods 46 and 58 are hingedly connected to a beam 61 that is hingedly mounted upon any suitable fixed support 60 by a supporting pin 62, with the connection being made by hinged pins 63 and 65.

The pull rod 46 is directly connected to a piston rod, or to a lever actuated thereby, for manipulating the bar 47 to which the brakes are attached. This manipulates the frame 16 upon the cross bar 17 and it also maintains the brake wheel 20 out of registry engagement with the wheel 7 that is shrouded and that has corrugations disposed upon the inner face of the shrouds 12 and 13 and upon the inner face 51 of the wheel 7. The braking wheel 20 is rubber tired as illustrated at 52 and the rubber tire is vulcanized or otherwise secured to the outer surface of the brake wheel 20. The rubber tire is preferably made of extremely tough, high-quality live rubber of a rubber compound with suitable admixture to make the same tough, pliable, resilient to wear and having long durability. When the rubber tire is brought into contact with the corrugated wheel 7, the wheel 20 is rotated and the axle 18 upon which the same is mounted is also rotated.

A port 53 is disposed within the pump housing and a valve 54 runs transversely of the port with a port passage way 55 running transversely of the valve 54 so that when the ports 53 and 55 are in registry with each other, the screw propeller 26 may be freely rotated within the pump housing. But as the valve 54 is rotated to place the respective ports 53 and 55 out of registry, or partially out of registry, a resistance is set up to the rotation of the spiral screw 26 rotating within the housing. The degree of resistance depending upon the amount of closing of the port 53 by the rotation or the partial rotation of the valve 54.

A valve stem 56 passes through the pump housing and an arm 57 is secured to the valve stem. The valve 54 and the valve stem 56 and the arm 57 are actuated by a bifurcated pull rod 58 that communicates movement of the piston rod of the air braking system of the car with the valve 54 by the connected communicating instrumentalities disposed between the piston rod not here shown and valve 54. As the brake shoes 49 and 50 wear, the wheel 20 may form frictional contact with the wheel 7 in advance of the brake shoes being actuated in conjunction with the brake wheels. To compensate for this I place a compressible block 59 within the frame 16, which prevents an over-stressing of the rubber tire due to maladjustment of the connecting instrumentalities of the braking system or due to over-wearing of the brake shoes or their removal from the brake assembly, or by a falling down of the various devices in the assembly. It will be noted that the rod 46 is threaded into the bifurcated jaw 46A and a lock nut 46B which provides additional adjustment and compensation for the wear of the brake shoes and the adjustment of the associated instrumentalities. It will also be noted that the rod 58 has a bifurcated jaw 58A threadably secured to the rod 58 in the conventional manner and a lock nut 58B locks the rod 58 in adjusted position relative to the bifurcated head 58A. This provides an additional adjustment where the rod 58 connects with the arm 57. The rods 46 and 58 are so connected that when the rod 46 is moved in one direction, the rod 58 may be moved in the opposite direction.

To prevent foreign matter getting into and contacting the rubber wheel and the abrading of the face of the wheel 7 placed on the car axle I place a screen cover 48 about the assembly comprising the brake wheel that is rubber tired and the wheel 7. The purpose of the screen is to prevent foreign matter contacting the respective wheels and to also screen the rubber of the tire from light.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. A pump embodying, in combination, a railway car truck having a brake beam and air instrumentalities for actuating the same, a car axle, wheels mounted upon said car axle and brake shoes carried by the brake beam for braking the wheels, a wheel having a corrugated face mounted on said car axle, a frame slidably mounted upon the brake beam of the truck frame and adapted for being actuated by the air brake mechanism of the railway car, a shaft carrying a spiral screw mounted upon a movable frame, a pump housing mounted upon the shaft and encasing the spiral screw in working relationship therewith to cause the screw to act as a pump when the screw is rotating within the housing, a braking wheel mounted upon said shaft and said braking wheel adapted for being actuated into and out of facial contact with the wheel mounted upon the car axle and means associated with the pump housing for setting up a resistance to the rotation of the spiral screw within the housing automatically as the brake wheel is moved into facial contact with the wheel disposed upon the car axle.

2. A pump embodying, in combination, a railway car truck having a brake beam and air brake instrumentalities actuating the beam, a car axle journaled within the car truck, wheels mounted upon said car axle and brake shoes mounted within said frame and adapted for braking the wheels, a wheel mounted upon the car axle, a frame slidably mounted within the truck frame, a brake wheel mounted within said frame and said wheel being adapted or being placed in registry with and being rotated by the wheel mounted upon the car axle when in registry therewith and automatic means for setting up a resistance to the rotation of the braking wheel as the brake shoes are moved into and engaged with the car wheels to be braked through the action of the air brakes.

3. In a device of the class described, in combination with a car axle, a corrugated wheel mounted upon the car axle, a pump shaft mounted adjacent the car axle, a brake wheel mounted upon the pump shaft and normally in spaced relation with the corrugated wheel and in registry alignment therewith, a fluid pump mounted upon the pump shaft and instrumentalities for moving the brake wheel into and out of registry engagement with the corrugated wheel disposed upon the car axle and automatic means for setting up a resistance to the rotation of the pump shaft as the same is moved toward the car axle.

4. In a device of the class described, in combination with a rail car truck having a brake beam and air brake instrumentalities for actuating the brake beam, a car axle journaled within the car truck and car wheels mounted upon the car axle, comprising a wheel to be braked mounted upon the car axle and placed between the car wheels, a braking wheel adapted for being moved into and out of braking engagement with the wheel mounted upon the axle, and hydraulic actuated instrumentalities for regulating the freedom of rotation of the braking wheel with said instrumentalities adapted for being actuated by the air brake actuators of the air brake system of the car.

5. In a device of the class described, the combination of a pump housing, a screw like pump disposed in the pump housing, a pump shaft for mounting the pump, a wheel having a rubber tire mounted upon the pump shaft, a wheel supported car axle, a shrouded braking wheel mounted upon the car axle and disposed in registry alignment with the rubber covered wheel disposed upon the pump shaft, and said rubber covered tire adapted for being moved into and out of registry with the wheel to be braked as the pump is actuated.

ERNEST C. NEAL.